US007680934B2

(12) United States Patent
Aubin et al.

(10) Patent No.: US 7,680,934 B2
(45) Date of Patent: Mar. 16, 2010

(54) METHOD AND APPARATUS FOR ASSIGNING AND ALLOCATING NETWORK RESOURCES TO LAYER 1 VIRTUAL PRIVATE NETWORKS

(75) Inventors: Raymond Aubin, Gatineau (CA); Malcolm Betts, Kanata (CA); Stephen Shew, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1503 days.

(21) Appl. No.: 10/810,244

(22) Filed: Mar. 26, 2004

(65) Prior Publication Data

US 2005/0216590 A1    Sep. 29, 2005

(51) Int. Cl.
*G06F 15/173* (2006.01)
(52) U.S. Cl. .................. 709/226; 709/223; 709/236; 709/241; 709/230; 370/443; 370/235; 370/231
(58) Field of Classification Search ............... 709/223, 709/226, 236, 241, 230; 370/323, 443, 235, 370/231
See application file for complete search history.

(56) References Cited

U.S. PATENT DOCUMENTS

| 6,694,437 | B1 * | 2/2004 | Pao et al. ................ 726/15 |
| 7,327,675 | B1 * | 2/2008 | Goode .................... 370/230 |
| 2001/0055291 | A1 * | 12/2001 | Schweitzer ............. 370/337 |
| 2002/0097725 | A1 * | 7/2002 | Dighe et al. ............ 370/395.1 |
| 2007/0261112 | A1 * | 11/2007 | Todd et al. .............. 726/11 |

OTHER PUBLICATIONS

International Telecommunication Union (ITU-T), *Layer 1 Virtual Private Network Service And Network Architectures*, Y.1313, Feb. 2004 (46 pages).
ITU-T, *Layer 1 Virtual Private Network Generic Requirements And Architectures*, Y.1312, Sep. 2003 (25 pages).
ITU-T, *Architecture for the Automatically Switched Optical Network (ASON)*, G.8080/Y.1304, Nov. 2001, (45 pages).
International Telecommunication Union (ITU-T), *Network-based VPNs—Generic architecture and service requirements*, Y.1311, Mar. 2002 (27 pages).
T. Takeda, et al. *Layer 1 Virtual Private Networks: Service Concepts, Architecture Requirements, and Related Advances in Standardization*, IEEE Communications Magazine, Jun. 2004, pp. 132-138.
Examination Report from corresponding European Patent Application 05 005 795.9 (10 pages).

* cited by examiner

*Primary Examiner*—Tammy T Nguyen
(74) *Attorney, Agent, or Firm*—Anderson, Gorecki & Manaras, LLP

(57) ABSTRACT

Network resources are assigned as dedicated, shared, or public network resources. The resources are then allocated to L1-VPN subscribers on demand. Splitting assignment of the resources from allocation of the resources enables resources to be assigned to more than one subscriber on the network. Temporary physical dedication of the resources to one of the subscribers may be accomplished by allocating the assigned resources on demand, so that particular subscribers are provided with dedicated resources on an as-needed basis. Dedication of the network resources allows the network resources to be configured, managed, and controlled by the customers. The network resources may be optical resources and the links may be time slots on particular fibers. Optionally, by enabling prioritization to cause displacement of link allocations, additional flexibility may be obtained in allocating links to L1-VPNs such as by allowing the use of private and shared resources by other subscribers.

20 Claims, 4 Drawing Sheets

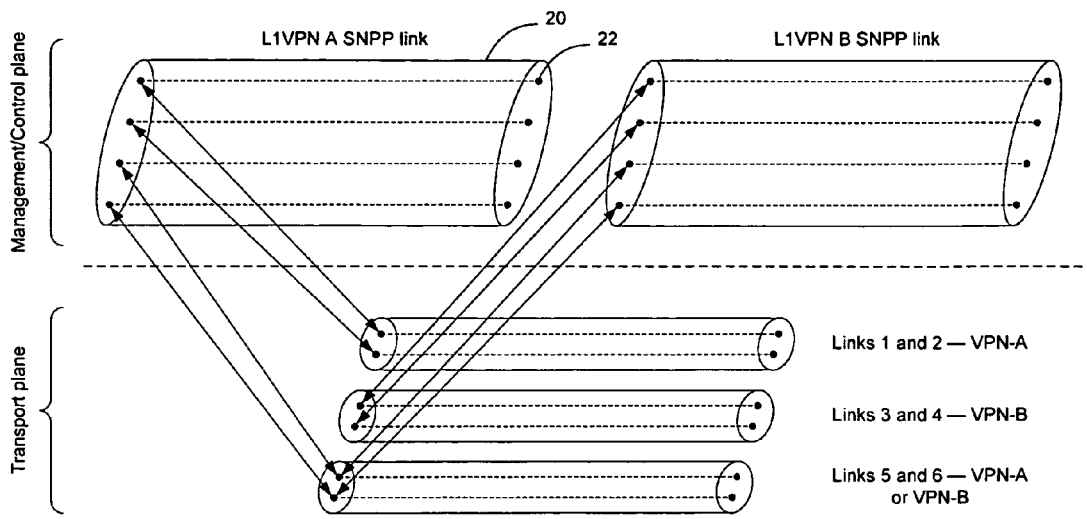
Figure 3
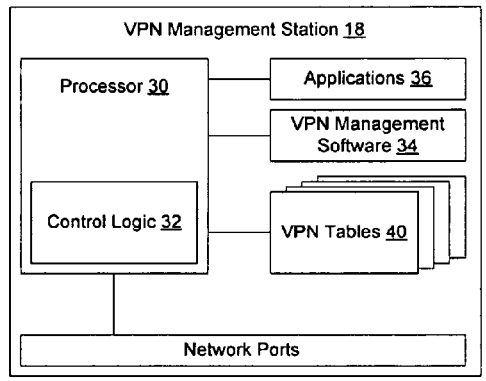
Figure 4
Figure 5

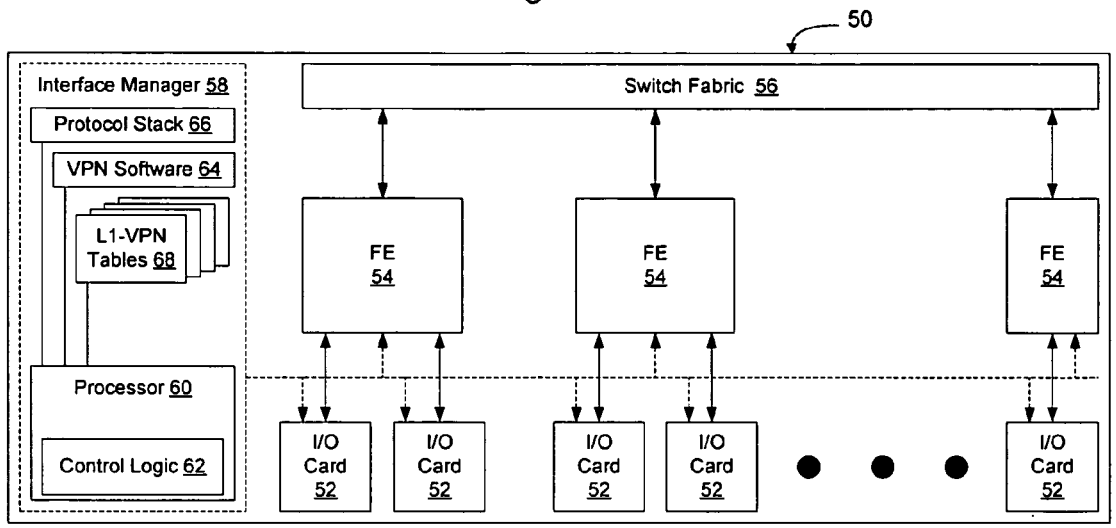

METHOD AND APPARATUS FOR ASSIGNING AND ALLOCATING NETWORK RESOURCES TO LAYER 1 VIRTUAL PRIVATE NETWORKS

BACKGROUND OF THE INVENTION

1. Field of the Invention

The present invention relates to communication networks and, more particularly, to a method and apparatus for assigning and allocating network resources to layer 1 virtual private networks.

2. Description of the Related Art

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units, such as Internet Protocol packets, Ethernet Frames, data cells, segments, or other logical associations of bits/bytes of data, between the network elements by utilizing one or more communication links between the devices. A particular protocol data unit may be handled by multiple network elements and cross multiple communication links as it travels between its source and its destination over the network.

Communication network subscribers may at times desire to have dedicated network resources allocated through a public or other entity's network infrastructure. For example, a subscriber may wish to lease network resources, such as optical network resources, from another network operator that has already installed optical fiber and optical networking equipment. This may be advantageous for the subscriber, for example, in that it may allow the subscriber to manage and control the network resources in a manner that would not be possible if the network resources were shared with other subscribers.

There are several scenarios where it may be desirable for a subscriber to purchase or lease a portion of a deployed network. For example, a network operator may wish to enter a particular market and not incur the up front costs associated with deploying its own optical network. Alternatively, a network operator may wish to deploy the physical assets only and allow other network operators to manage the use of those network assets. An example of this scenario may be a company that installs a large optical fiber bundle across an obstacle such as the Atlantic Ocean, and then desires to allow companies to lease portions of the bandwidth for transmission of data across the ocean. The company that owns the cable may not have any interest in operating a network across that cable but rather would prefer to simply collect for allowing others to use the cable to transmit information. In these and other situations, it becomes desirable to allocate a portion of the deployed physical assets to a particular customer.

Virtual Private Networks (VPNs) at Layers 2 and 3 of the network hierarchy are able to create tunnels through an otherwise provisioned network, and allow the network to be shared by many different participants in a secure manner. These VPNs, however, do not actually obtain dedicated rights to the network resources for transmission of data associated with the VPN. Rather, the data is mixed together with other traffic and transmitted in common with other traffic on the network. For example, an MPLS VPN may be used to create a VPN tunnel across an MPLS network. RSVP-TE or another protocol may be used to reserve statistical resources for that tunnel. However, the packets that are sent over the tunnel are not sent over dedicated resources on the network, but rather are multiplexed with numerous other packets from other VPNs as they travel through the network.

Thus, although a subscriber of layer 2 or layer 3 VPN network services may be guaranteed bandwidth on a network in a statistical fashion, it does not have dedicated resources on the network to handle its traffic. Without having dedicated resources on the network, the subscriber cannot control the network resources since doing so would affect other network subscribers. The lack of control limits the subscribers ability to customize the network to accommodate its requirements, and thus requires the subscriber to request network changes from the network owner, which is generally a slow process and, more importantly, may not be possible given the shared nature of the network resources. Thus, layer 2 and 3 VPNs are not suitable for particular subscribers that may wish to exert control over the network resources.

Conventionally, to provide dedicated resources, it was necessary for the subscriber to purchase a portion of the network to create an actual private network. This required the client to obtain sufficient resources to meet its expected peak load, did not allow for resources to be shared (except at layer 2 and above) and did not provide flexibility to enable additional resources to be obtained quickly or on demand.

SUMMARY OF THE INVENTION

The present invention overcomes these and other drawbacks by providing a method and apparatus for assigning and allocating network resources to layer 1 virtual private networks. Layer 1 Virtual Private Networks (L1-VPNs) allow network resources to be physically assigned to a particular customer such that the resources deployed within the network may be controlled by the customer. This allows the subscriber to test the links and devices on the network, reset the links, perform fault detection and notification operations, and perform many other functions as if the subscriber owned the network resources. According to an embodiment of the invention, assignment of network resources to L1-VPNs is separated from allocation of the resources, so that network resources may be assigned to more than one subscriber on the network even though they will only be allocated to one L1-VPN subscriber at a time. The temporary physical dedication of the resources to one of the subscribers may be accomplished by allocating the assigned resources on demand so that a particular subscriber is provided with dedicated resources on an as-needed basis.

According to an embodiment of the invention, resources on a communication network may be assigned for use by a particular L1-VPN customer, a group of L1-VPN customers, or any L1-VPN customer, and then allocated to the L1-VPN customers on an as-needed basis. Assigning resources such as links through the network and interfaces on network elements enables L1-VPN customers to obtain particular network resources that may be configured, managed, and controlled by the customers. Allocating the assigned resources to the customers on an as needed basis allows for sharing of assigned resources between multiple customers to enable over-subscription of network resources in the L1-VPN context. According to an embodiment of the invention, a management plane on the network assigns links, either logical or physical, to particular VPNs when the L1-VPNs are first set up on the network. The link assignment is then passed to a control plane configured to maintain current allocation information about the network. When a request for L1-VPN services is then received, e.g. by the control plane, the assigned resources may be allocated to the L1-VPN. The allocation is then passed to the network elements forming the transport plane to allow the L1-VPN services to be provided to the requesting subscriber.

The network resources may be optical resources and the links may be time slots on particular fibers. The network resources may be links on the network, and may be parallel-aggregated or serial-aggregated links. The network resources may be dedicated, shared, or public network resources that may be allocated to a particular L1-VPN, a set of particular L1-VPNs or any requesting L1-VPN respectively. Optionally, by enabling policy to be implemented in the allocation process, such as by enabling prioritization to cause displacement of link allocations, additional flexibility may be obtained in allocating links to L1-VPNs.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIG. 3 is a functional block diagram illustrating the relationship of L1-VPNs between the management/control plane and the transport plane according to an embodiment of the invention;

FIG. 4 is a functional block diagram of a L1-VPN management station according to an embodiment of the invention;

FIG. 5 is a functional block diagram of an example VPN table for use in the L1-VPN management station according to an embodiment of the invention;

FIG. 6 is a functional block diagram of a network element including L1-VPN capabilities according to an embodiment of the invention;

FIG. 7 is a functional block diagram of example L1-VPN tables for use in the network element of FIG. 6 according to an embodiment of the invention;

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

According to an embodiment of the invention, resources on a communication network may be assigned for use by a particular L1-VPN customer, a group of L1-VPN customers, or any L1-VPN customer, and then allocated to the L1-VPN customers on an as-needed basis. Assigning resources such as links through the network enables L1-VPN customers to obtain particular network resources that may be configured, managed, and controlled by the customers. Allocating the assigned resources to the customers on an as needed basis allows for sharing of assigned resources between multiple customers to enable oversubscription of network resources in the L1-VPN context.

According to one embodiment of the invention, a management plane on the network assigns links, either logical or physical, to particular VPNs. The link assignment is passed to a control plane and allocated to L1-VPN customers dynamically as required, so that the network elements, links, and other resources forming the transport plane may be temporarily dedicated to be used by a L1-VPN customer as required. The network resources may be optical resources or other types of network resources, and the links may be time slots on particular fibers or other discrete network components. These and other embodiments will be discussed in greater detail below in connection with FIGS. 1-9.

Figure 1:
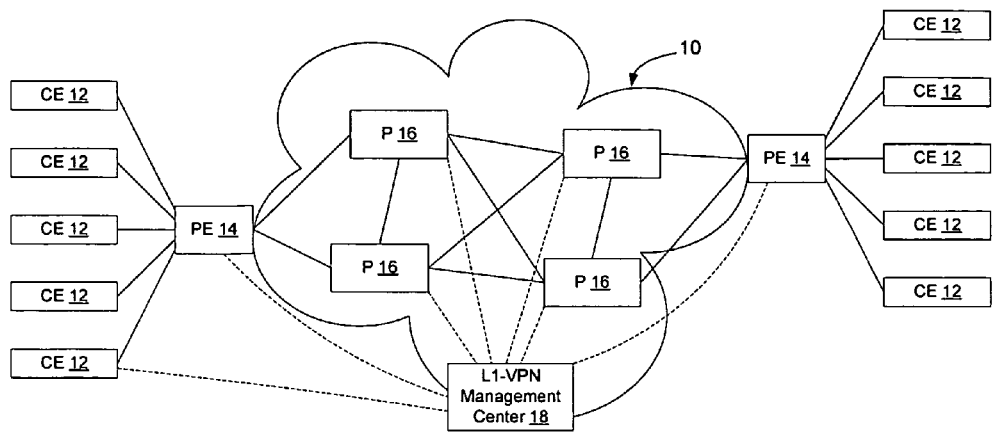
FIG. 1 is a functional block diagram of a portion of an example communication network including a L1-VPN management center, and illustrating control plane connections according to an embodiment of the invention.

FIG. 1 illustrates a communication network 10 in which Customer Edge (CE) network elements 12 are interconnected over a provider's network containing Provider Edge (PE) network elements 14 and Provider (P) network elements 16. The difference between PE network elements 14 and P network elements is that PE network elements are configured to interface with the CE network elements 12 (which may be owned by the provider or owned by the customer) whereas P network elements are configured to operate wholly within the provider's network. In an optical network, interactions between the CE network elements 12 and the PE network elements 14 may take place using a suitable optical protocol such as User to Network Interface (UNI), although numerous other protocols may be used to control interactions between the CE and PE network elements. Exchanges between the PE and P network elements may take place using Network to Network Interface (NNI) or another suitable protocol. The invention discussed herein is not limited to a particular network configuration or to particular protocols in use on the network. Thus, although an embodiment of the invention will be described herein in connection with the example network set forth in FIGS. 1 and 2, the invention is not limited to implementation on this type of network or on the particular example network illustrated herein.

FIG. 1 also includes a L1-VPN management center 18, configured to interface with the P and PE network elements, and optionally with the CE network elements. The L1-VPN management center is configured to implement a management plane configured to assign resources to L1-VPNs and a control plane configured to dynamically allocate resources on the network to L1-VPN customers on an as-needed basis. The management center 18 may be located on the provider's network in a convenient location, such as in a control center, or may be co-located with one or more of the network elements 14, 16 forming the network 10. Optionally, multiple control centers may be included on the network for redundancy purposes, to provide a backup facility should something happen to the primary facility or should connectivity between one or more of the network elements and the management center be disrupted. The invention is not limited to including the management center at a particular location or plurality of locations on the network. Optionally, the management center may be a distributed process configured to run in the several network elements on the network, although the invention is not limited to this embodiment.

The management center may be connected to the network elements using dedicated control channels, or may be connected to the network elements through the data network being controlled by the control plane and forming the transport plane in the network 10. The invention is not limited to a particular manner of interconnecting the management center and the network elements or the particular protocols used to interface these network constructs. Examples of several protocols that may be used to communicate between these devices include Transaction Language 1 (TL1), a telecommunications management protocol used extensively to manage SONET and optical network devices, and TeleManagement Forum 814 (TMF-814), a telecommunications management protocol developed for the management of SONET/SDH/WDM/ATM transport networks.

The management center allocates VPNs over links on the network. According to one embodiment of the invention, the network is an optical network including optical fibers forming links between optical networking equipment at the nodes on the network. Conventionally, data is transmitted over optical fibers by breaking the available light for transmission into lambdas, and then further subdividing the lambdas into time slots. Each time slot on each lambda may be considered a link. Alternatively, groups of time slots on a lambda or time slots on different lambdas may be grouped to form logical links on the network. Thus, link connections between associated connection points in a network that terminate on the same subnetwork can be aggregated in parallel to form a link on the network. A link including several parallel connections will be referred to herein as a parallel-aggregated link.

Additionally, individual fibers are terminated at connection points and signals from the fibers are passed on toward subsequent connection points on the network over other optical fibers. Link connections on separate fibers can be aggregated in series to form a serial-aggregated link connection i.e., a series of contiguous link connections and subnetwork connections. This in turn allows the construction of serial-aggregated links. As used herein, the term "link" is to be interpreted as encompassing parallel-aggregated links, serial-aggregated links, serial-parallel-aggregated links, logical links, simple connections between connection points, and other logical associations of time slots on lambdas on the network. Allocation of links may require the concomitant creation and allocation of interfaces on the network element.

Although the invention will be discussed herein in terms of allocation of optical layer 1 resources to a L1-VPN on an optical network, the invention is not limited to allocation of optical network resources. Rather, the invention may similarly be used to allocate other resources, such as optical resources in a wireless optical network, RF resources on a wireless data network, and other physical network resources in other types of networks. Thus, the invention may be used advantageously in multiple types of communication networks. Numerous types of layer 2 through layer 7 traffic may be carried on the L1-VPN resources, and the invention is not limited to any particular type of traffic on the L1-VPN.

Figure 2:
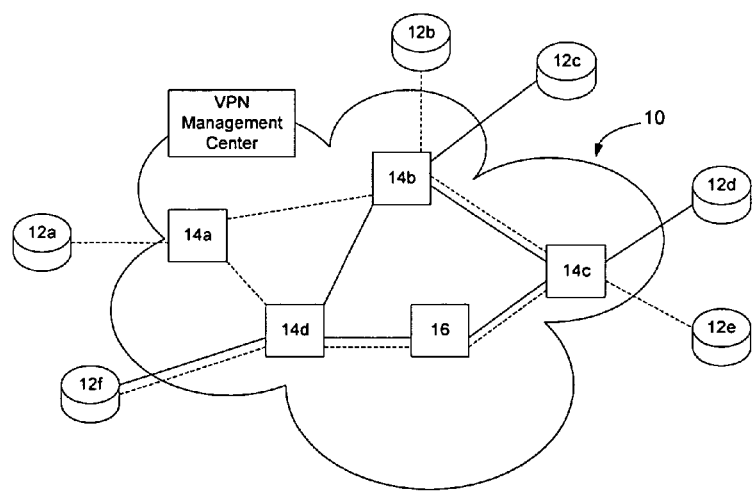
FIG. 2 is a functional block diagram of a portion of a communication network illustrating transport plane connections, for example of L1-VPNs, according to an embodiment of the invention.

FIG. 2 illustrates several example layer 1 VPNs (L1-VPNs) that have been created through a communication network. As shown in FIG. 2, L1-VPNs may be configured between multiple CE network elements 12 and involve links between multiple CE, PE, and P network elements. As discussed above, each physical link may be considered a link in the L1-VPN context. For example, the link between CE-12*a* and PE-14*a* may be considered a link. Alternatively, two or more individual links between CE-12*a* and PE-14*a* may be grouped together and considered a link (parallel-aggregated link). Similarly, links may be serially aggregated to form a serial-aggregated or serial-parallel-aggregated link through the network. For example, in FIG. 2, the combination of links between CE-12*a* and PE-14*a*, PE-14*a* and PE-14*b*, and PE 14*b* and CE-12*b*, may be considered a link on the network. The VPN management center may keep track of the links and groups of links, referred to herein as virtual links, to assign L1 resources on the network 10.

FIG. 3 is a functional block diagram illustrating the relationship of L1-VPNs between the control/management plane and the transport plane according to an embodiment of the invention. The control/management plane represents the view of the network as seen from the management station whereas the transport plane represents the network as viewed by the network elements forming the network.

As shown in FIG. 3, the control/management plane creates links 20 containing one or more link elements 22. The control/management plane may be, for example, defined in the management station and defined by software configured to represent the network and perform control and management functions on the network. The links 20 are assigned by the control/management plane to L1-VPNs.

According to an embodiment of the invention, control subnetwork points (SNPs) in the control plane are associated with transport connection points in the transport plane. The potential connection point-SNP associations are determined by configuration, while actual associations are determined at the time a connection is made. This allows network outages and other faults on the network to be accommodated.

From a routing perspective, transport link connections are associated to SNP link connections. SNPs may be grouped into subnetwork point pools (SNPPs) for the purpose of routing. Associations between SNPPs are called SNPP links. When a VPN subscriber initially contracts for L1-VPN resources, the management station provides routes through the network by assigning SNPP links to the L1-VPN; The SNPP link assignment is then provided to the control plane and allocated links are translated to the transport plane.

From a link allocation perspective, connection points (CPs) are associated to create link connections. Link connections are aggregated to create links. These links are used for L1-VPN resource management. The L1-VPN link assignments that are affected by the SNPP link assignment will be passed to the transport plane to affect the assignment on the network. According to an embodiment of the invention, a given SNPP link may include dedicated, shared, or public link connections. Enabling SNPP links to include shared links and public links enables a network operator to oversubscribe the network resources by enabling a particular physical link on the network to be assigned to more than one subscriber, even though the link will only be allocated to one subscriber at a time.

Thus, SNPP links are created and assigned to VPNs in the control/management plane. This assignment is translated to link connections through connection points on the network, and the assignment is passed from the management plane to the control plane to enable the control plane to allocate the resources on demand as needed. Allocations are passed to the transport plane to allow traffic to be carried on the configured L1-VPNs. FIG. 4 illustrates an embodiment of a VPN management station 18. As shown in FIG. 4, the VPN management station includes a processor 30 containing control logic 32 configured to enable it to run VPN management software 34 and other applications 36 to control the creation of VPNs on the network. The VPN management station 18 also includes ports 38 to enable the control operations to be communicated to the network elements forming the transport plane of the network. VPN tables 40 created by the VPN management software 34 and applications 36 maintain information about the configuration of the network, current assignments and allocations, and other information of interest to the VPN management software and applications. Other modules may be included as well, and the invention is not limited to an embodiment containing all of the illustrated components or only the illustrated components.

FIG. 5 illustrates an example of a table 42 that may be used to maintain link information in the VPN tables 40 in the control plane. As shown in FIG. 5, the table 42 includes information identifying the links on the network and ownership information indicating the assignment of the links with one or more L1-VPNs. For example, in FIG. 5 the table includes entries for Link ID-1 and Link ID-2 and associated ownership information for VPN-A. This corresponds to the first two SNP links of L1-VPN-A SNPP link 20 illustrated on the left in FIG. 3. Table 42 also includes the identification of links associated with VPN-B. Specifically, Table 42 includes entries for Link ID-3 and Link-ID 4, and ownership information associated with VPN-B. Table 42 further includes entries for Link ID-5 and Link ID-6, containing ownership information for VPN-A or VPN-B. This indicates that these links, corresponding to links 5 and 6 in FIG. 3, are to be shared by VPN-A and VPN-B. As discussed in greater detail below, either VPN (VPN-A or VPN-B) that needs these links will be able to reserve one or more of them (according to their service level agreement) and the links will be allocated to the particular requesting VPN as required and according to the policy implemented in the control plane. When the need for the link ends, the link allocation will be released and it will become available for use by the other VPN or may be allocated subsequently back to the same VPN.

Link allocation may look at information other than assignment information, such as the service level agreement associated with the subscriber and the subscriber's current usage on the network. For example, the management plane may assign two dedicated links and two shared links to a particular L1-VPN, but the subscriber may only have paid for the concurrent use of three links on the network. If the subscriber then submitted a request for resources that exceeded the usage specified in its service level agreement (SLA), the subscriber's request may be rejected as exceeding its SLA. Alternatively, the subscriber may be provided with access to L1-VPN resources, either from available shared resources or from public resources, and charged additional fees for access to the resources that exceed its SLA.

FIG. 5 also includes entries for links that may be used by any VPN. These public links may be allocated to any L1-VPN and, when no longer required, released to a public pool to be used by other VPNs at a later time.

FIG. 6 illustrates a network element 50 configured to operate in the transport plane and containing control plane software configured to implement L1-VPN allocations according to an embodiment of the invention. The network element 50 may be, for example, a P, PE, or CE network element, or another type of network element on the communication network. As shown in FIG. 6, the network element includes a plurality of Input/Output cards 52, which may also be referred to as line cards, configured to connect with physical media on the network. As mentioned above, the physical media may include optical fibers, electrical wires, free space lasers and optical detectors, wireless antennas, and many other types of physical media. The I/O cards 52 interconnect the physical media with forwarding engines 54 which process the signals and interface the signals to a switch fabric 56. The switch fabric enables the signals to be routed between I/O cards to allow the signals to come in at one port and exit the network element at another port. It should be understood that the invention is not limited to a network element configured in the manner discussed above as numerous other architectures may be used to create a network element.

In the embodiment illustrated in FIG. 6, an interface manager 58 interfaces the I/O cards 52 and forwarding engines 54 to configure the network element 50 to support L1-VPNs on the communication network. The interface manager 58 according to an embodiment of the invention, may include a processor 60 containing control logic 62 configured to enable VPN software to run on the network element. The invention is not limited to an embodiment in which the interface manager contains its own processor, however, as the interface manager may be implemented as a process running on another processor on the network element. For example, the interface manager may be instantiated on a processor on one of the forwarding engines or I/O cards, may be instantiated as a distributed process on multiple forwarding engines and/or I/O cards, may be instantiated on another processor on the network element, or may be interfaced to the network element from external to the network element.

The interface manager 58 implements VPN software 64 which may be executed on the processor 60 and may be configured to allocate network element resources to L1-VPNs, as discussed herein. Optionally, a protocol stack 66 may be included to enable the network element to engage in protocol exchanges on the network 10. The interface manager also includes L1-VPN tables 68 to enable it to maintain assignment, allocation, state, policy, and other information associated with the L1-VPNs configured on and through the network element. The L1-VPN tables 68 may be included on one or more memories on the interface manager 58, on the network element 50, or may be interfaced to the network element from an external source.

FIG. 7 illustrates several tables 70, 72 that may be included in the L1-VPN tables 68 in the interface manager of FIG. 6. These tables may be individual tables, may be one table with separate sections, may be linked or included as one table, or may be configured in numerous other ways. Additional tables may be included as well and the invention is not limited to an embodiment that includes only these particular tables.

As shown in FIG. 7, according to one embodiment of the invention, two tables are included in the L1-VPN tables for use by the interface manager. In particular, in this embodiment, the L1-VPN tables include a configured assignment table 70 indicating the links assigned to each L1-VPN, and a dynamic allocation table indicating which of the links are bound or free, and optionally indicating which of the VPNs is currently using which link. In these tables, the information in the configured assignment table is derived from information obtained from the management plane and indicates which links may be allocated to each of the L1-VPNs. The dynamic allocation table indicates the current state of the network and contains information indicating which of the assigned links are currently being used by a L1-VPN. Optionally other information may be maintained in the tables as well, such as an indication of the service level agreement associated with the various L1-VPN subscribers on the network to enable the network elements to make determinations as to how a request for L1-VPN services should be handled from an accounting perspective.

Figures 8, 9:
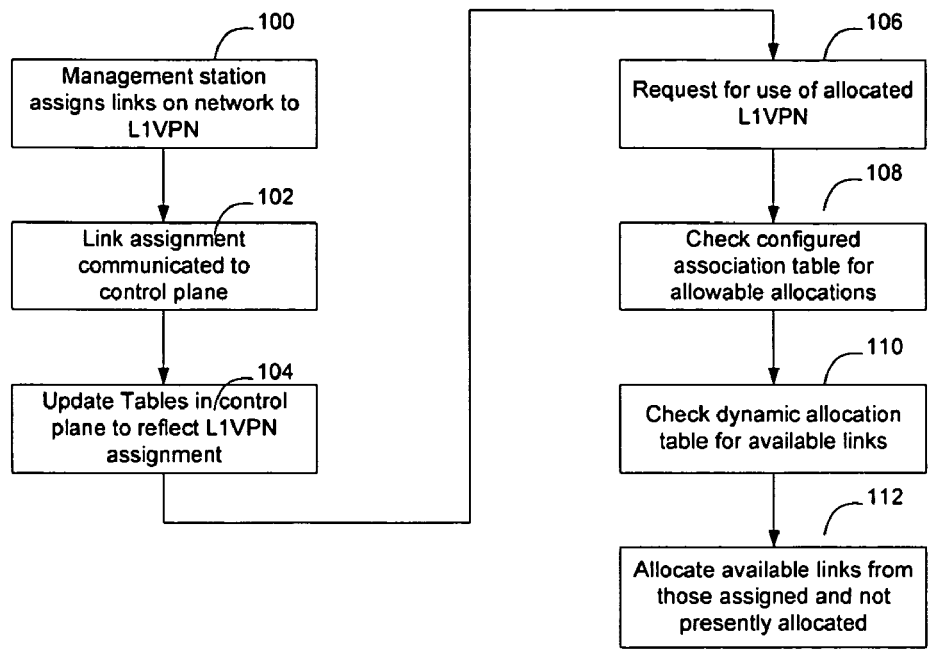
FIG. 8 is a flow chart illustrating a process of allocating links to a L1-VPN upon request on a communication network such as the communication network of FIGS. 1 and 2 according to an embodiment of the invention.
FIG. 9 is a functional block diagram of example L1-VPN tables for use in the network element of FIG. 6 according to another embodiment of the invention.

FIG. 8 illustrates a process that may be used to implement the L1-VPN assignments and allocations. As discussed above, the links on the network are assigned to L1-VPNs by the management plane (100). This assignment information is communicated to the control plane (102) so that the tables 60 may be updated to reflect the L1-VPN assignment (104). In another embodiment, the information may remain in the management plane which may maintain information about the dynamic allocation of L1 resources on the network. The invention is not limited to the embodiment illustrated in FIG. 8. As indicated above, assignment of links to a L1-VPN does not enable the L1-VPN to place traffic on the links or otherwise use the links. Rather, assignment of links to a L1-VPN allows resources to be allocated to the L1-VPN upon request.

Subsequently, when the subscriber to the L1-VPN service requires network resources, it will send a request for use of network resources (106). The request may be fulfilled from the assigned private resources, assigned shared resources, or public resources. The order in which assigned and public resources are allocated to fulfill requests may depend on the policy implanted on the network. For example, the order in which links are selected for resource allocation between the dedicated, shared, and public links, may be specified in the policy. Additionally, the priority scheme for a link may be set by policy to certain enable L1-VPNs to have priority over other L1-VPNs on particular links. The allocation of public links to L1-VPNs may also depend on policy on the network. For example, the policy may control how many public links may be allocated to a particular L1-VPN, the percentage of public links that may be used to provide L1-VPN services to a particular customer, whether public links may be used for restoration and reconfiguration by the L1-VPN, and numerous other aspects on the network.

To fulfill the request, the network element will check the configured assignment tables to see which links or other resources have been assigned to the L1-VPN issuing the request (108). For example, in FIG. 7, VPN-A has been assigned resources with Link ID=1, 2, 5, and 6. Similarly, as discussed above, VPN-B has been assigned resources with Link ID=3, 4, 5, and 6. The fact that a particular link may appear as being assigned to multiple VPNs allows links on the network to be shared by two or more L1-VPNs. Likewise, the public links appear as an entry in each VPN entry to allow the public links to be allocated to any L1-VPN. In another embodiment, a list of public links may be provided as well.

Once the network element has determined which links have been assigned to the requesting L1-VPN, the network element checks to see which of the links are currently being used and which of the assigned links are available to be allocated to the requesting VPN (110). This may be done, according to one embodiment of the invention, by looking into the dynamic allocation section of the L1-VPN tables to determine which of the assigned links are currently not being used. The links are then assigned to fulfill the request (112) according to the policy implemented on the network, as described in greater detail above.

In the example illustrated in FIG. 7, it will be assumed that a request for two links has been submitted by VPN-A. As discussed above, upon receiving the request, the network element will look into the configured assignment table to determine which links are assigned to VPN-A. In this example, links 1, 2, 5, and 6 have been assigned to VPN-A. The network element will then look into the dynamic allocation table and determine that, of links 1, 2, 5, and 6, links 1 and 6 are "bound" or currently allocated to a L1-VPN. The links may be bound to the requesting VPN customer or to another VPN customer. Accordingly, the network element will know that it may assign links 2 and 5 to VPN-A to fulfill the request.

Resources, once assigned and allocated, are used exclusively by the L1-VPN and are not shared resources on the network. Thus, for example in an optical network, the link may be a time slot on a wavelength. Once assigned and allocated to a particular L1-VPN, that time slot on that wavelength would be used exclusively for transportation of traffic for the VPN to which it was allocated. Dedication of the resources is communicated to the transport plane to enable the transport plane to handle traffic for the L1-VPN to which the resources have been allocated.

If there are not sufficient unallocated links to fulfill the request, the network element may look for a public link that may be used to fulfill the request, depending on the policy implemented on the network. If insufficient links are unallocated, the network element will notify the subscriber that the request failed. If a public link is unallocated, the public link may be allocated to the requesting L1-VPN to fulfill the request. Once the public link is allocated, it will be used exclusively for that L1-VPN until released into the public link pool.

Since shared and public resources may need to be used by more than one subscriber, the network element may be configured to implement policy relating to which resources should be allocated to particular subscribers as described in greater detail above. For assume that the policy on the network specifies that private resources are to be allocated first, shared resources are to be allocated second, and public resources are to be allocated only when there are not sufficient private and shared resources to fulfill the request, to conserve the availability of the shared and public resources. One way to do this is to list the dedicated and shared links in a predetermined order so that the network element may select the dedicated links preferentially over the shared and public links. For example, in the embodiment illustrated in FIG. 7, the present allocation table has been set up so that the dedicated links are listed first in the column for each VPN, the shared links are listed second in the column for each VPN, and the public links are listed third in the column for the VPN. Thus, VPN-A contains dedicated links 1 and 2, shared links 5 and 6, and has access to whatever public links are available. By listing the links in this order and preferentially selecting links toward the top of the list to fulfill L1-VPN requests, the network element may preferentially assign dedicated links before shared links without keeping track of which links are dedicated and which are shared. The invention is not limited to this embodiment, however, as other mechanisms may be used as well, such as through the use of "shared" and "public" designations, or other constructs in the tables to explicitly keep track of which links are dedicated, which are shared, and which are public.

FIG. 9 illustrates another embodiment of a set of L1-VPN tables 60 that may be used to allocate resources in the transport plane. In the embodiment of FIG. 9, resources are assigned to primary subscribers and secondary subscribers such that assigned resources may be allocated to secondary L1-VPN subscribers when not in use by the primary subscriber, and then allocated to the primary subscriber by removing the secondary subscriber when the primary subscriber requires the resources. This may be done, as described herein, by implementing L1-VPN priority as part of the network policy.

As shown in FIG. 9, the configured assignment table 80 remains unchanged, although the invention is not limited in this manner as additional information may be added to the configured assignment table indicating which VPN subscribers are allowed to engage in resource sharing on the network. The dynamic allocation table, by contrast, includes additional information to enable the network element to determine who is using the links to determine if the current user should be removed in favor of a new user requesting access to the services. Specifically, instead of having a state="bound" or state="free" indication for each link, the dynamic allocation table, according to an embodiment of the invention, includes additional information such as "in use by B" or "in use by C." This indicates to the network element which VPN is using the resources at the present time.

In the example illustrated in FIG. 9, the status "bound" indicates that the link is being used by one of the primary VPNs to which it was assigned, the status "free" indicates that the link is not being used, and the status "in use by VPN-x" indicates that a VPN other than a primary assigned VPN is using that link. Since the primary assigned VPN has priority over a secondary VPN, upon a request from the primary assigned VPN for L1-VPN resources, the primary assigned VPN will be allocated the link, even though it is currently in use by another VPN, since the primary assigned VPN has priority over the other VPN.

For example, assume that VPN-A submitted a request for two links and the status of the links was as shown in FIG. 9. The network element would look to see which links are primarily assigned to VPN-A and determine that links 1, 2, 5, and 6 have been primarily assigned to VPN-A. The network element would then look at the dynamic allocation table and determine that links 1 and 6 are bound, indicating that they are in use by a primary VPN to which they are assigned. Links 2 and 5, however, are "in use by B" and "in use by C" which indicates that these links may be allocated to VPN-A, even though they are currently being used on a temporary basis by these other VPNs, because VPN-A is a primary VPN on that link. Accordingly, the network element will cease the allocation to these other VPNs and reallocate links 2 and 5 to VPN-A.

Maintaining information in the dynamic allocation table about the relative priority of the VPN using the network resources enables new allocations to be made to accommodate the displaced VPN allocations. For example, when link 2 is allocated to VPN-A, the network element knows that VPN-B needs a new link allocation and can search the configured assignment and the dynamic allocation tables for a link to be assigned to VPN-B. In this example, VPN-B has been assigned links 3, 4, 5, and 6. Accordingly, the network element will determine that links 3, 4, 5, and 6 have been assigned to VPN-B and that link 3 currently is free. Thus, the network element will allocate link 3 to VPN-B. If link 3 had not been available, the network element would have determined that there none of the assigned links were able to be allocated to VPN-B and may search the public links for a potential allocation. If the public links were also allocated, it could then search for another link allocation where B has priority over another VPN. By enabling prioritization to cause displacement of link allocations, additional flexibility may be obtained in allocating links to L1-VPNs.

The functions described above including these described with respect to FIG. 8, may be implemented as one or more sets of program instructions that are stored in a computer readable memory within the network element(s) and executed on one or more processors within the network element(s). However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of assigning and allocating physical network resources to enable Layer 1 Virtual Private Networks (L1-VPNs) to be created within a communication network of the physical network resources, each of the L1-VPNs including dedicated physical network resources which are physically assigned to the L1-VPN and able to be controlled and provisioned for use exclusively within the L1-VPN, the method comprising the steps of:

collecting information about available physical network resources used to implement the communication network;

designating a first subset of the available physical network resources as dedicated L1-VPN resources, the dedicated L1-VPN resources being physical resources on the communication network that are designated as being dedicated to be provisioned and used only within a first L1-VPN, at least a first portion of the dedicated L1-VPN resources being assigned to the first L1-VPN for exclusive use within the first L1-VPN;

designating a second subset of the available physical network resources as shared L1-VPN resources, the shared L1-VPN resources being physical resources on the communication network that are allocated as available to be assigned for use in two or more separate L1-VPNs, at least a first portion of the shared L1-VPN resources being assigned to the first L1-VPN for exclusive use within the first L1-VPN to enable the first portion of the shared L1-VPN resources to be provisioned and used only within the first L1-VPN and at least a second portion of the shared L1-VPN resources being unassigned and able to be assigned to the first L1-VPN or a second L1-VPN for exclusive use within the first L1-VPN or second L1-VPN on demand;

receiving a request associated with the first L1-VPN for network resources; and allocating assigned network resources from the first portion of the dedicated L1-VPN resources to fulfill the request;

wherein the step of allocating assigned network resources comprises determining current assignment information for the L1-VPN to determine which network resources have been assigned to the L1-VPN, and allocating network resources to the L1-VPN from the first portion of the dedicated L1-VPN resources if those network resources have not previously been allocated to the L1-VPN.

2. The method of claim 1, wherein the resources assigned to the first L1-VPN are dedicated to the first L1-VPN.

3. The method of claim 1, wherein the first L1-VPN and second L1-VPN are a first group of L1-VPNs, and wherein the resources assigned to the first group of L1-VPNs may be used by one of the group members at a time.

4. The method of claim 1, further comprising designating a third subset of the resources as public L1-VPN resources.

5. The method of claim 1, wherein resources not designated as dedicated L1-VPN resources and not designated as shared L1-VPN resources are public L1-VPN resources.

6. The method of claim 1, further comprising the step of communicating information associated with the steps of designating the first subset of the resources as dedicated L1-VPN resources; and designating the second subset of the resources as shared L1-VPN resources to network elements to enable those resources to be allocated on the communication network.

7. The method of claim 1, further comprising designating a third subset of the resources as public L1-VPN resources, and wherein the step of allocating assigned network resources comprises determining current assignment information for the L1-VPN to determine which of the first portion of the shared L1-VPN network resources have been assigned to the L1-VPN, and determining which of the assigned network resources are currently in use.

8. The method of claim 7, wherein the step of allocating further comprises selecting network resources from the first portion of the shared L1-VPN network resources that have been assigned to the L1-VPN and which are not currently in use to fulfill the request, and selecting public network resources to augment the assigned resources to fulfill the request if necessary.

9. The method of claim 8, wherein the first L1-VPN and second L1-VPN are a first group of L1-VPNs, and wherein the step of allocating comprises prioritizing between L1-VPNs to enable the first L1-VPN to obtain L1-VPN resources associated with the first portion of the shared L1-VPN network resources that are currently in assigned to a third L1-VPN that is not part of the first group of L1-VPNs.

10. The method of claim 9, wherein prioritizing results in a transfer of the network resource from the third L1-VPN to the first L1-VPN.

11. The method of claim 1, wherein the step of allocating is done on demand.

12. The method of claim 1, wherein the step of allocating allows network resources to be shared between multiple L1-VPN subscribers by allowing the same network resources to be allocated to more than one L1-VPN subscriber, one L1-VPN subscriber at a time.

13. An apparatus for assigning and allocating physical network resources to enable Layer 1 Virtual Private Networks (L1-VPNs) to be created within a communication network of the physical network resources, each of the L1-VPNs including dedicated physical network resources which are physically assigned to the L1-VPN and able to be controlled and provisioned for use exclusively within the L1-VPN, the apparatus comprising:

a processor containing control logic configured to:

collect information about available physical network resources used to implement the communication network;

designate a first subset of the available physical network resources as dedicated L1-VPN resources, the dedicated L1-VPN resources being physical resources on the communication network that are designated as being dedicated to be provisioned and used only within a first L1-VPN, at least a first portion of the dedicated L1-VPN resources being assigned to the first L1-VPN for exclusive use within the first L1-VPN;

designate a second subset of the available physical network resources as shared L1-VPN resources, the shared L1-VPN resources being physical resources on the communication network that are allocated as available to be assigned for use in two or more separate L1-VPNs, at least a first portion of the shared L1-VPN resources being assigned to the first L1-VPN for exclusive use within the first L1-VPN to enable the first portion of the shared L1-VPN resources to be provisioned and used only within the first L1-VPN and at least a second portion of the shared L1-VPN resources being unassigned and able to be assigned to the first L1-VPN or a second L1-VPN for exclusive use within the first L1-VPN or second L1-VPN on demand;

receive a request associated with the first L1-VPN for network resources; and allocate assigned network resources from the first portion of the dedicated L1-VPN resources to fulfill the request;

wherein the step of allocating assigned network resources comprises determining current assignment information for the L1-VPN to determine which network resources have been assigned to the L1-VPN, and allocating network resources to the L1-VPN from the first portion of the dedicated L1-VPN resources if those network resources have not previously been allocated to the L1-VPN.

14. The apparatus of claim 13, wherein the first L1-VPN and second L1-VPN are a first group of L1-VPNs, and wherein the resources assigned to the first group of L1-VPNs may be used by one of the group members at a time.

15. The apparatus of claim 13, wherein the control logic is further configured to designate a third subset of the resources as public L1-VPN resources.

16. The apparatus of claim 13, wherein resources not designated as dedicated L1-VPN resources and not designated as shared L1-VPN resources are public L1-VPN resources.

17. The apparatus of claim 13, wherein the control logic is further configured to designate a third subset of the resources as public L1-VPN resources, and wherein the control logic configured to allocate assigned network resources is further configured to determine current assignment information for the L1-VPN to determine which of the first portion of the shared L1-VPN network resources have been assigned to the L1-VPN, and determine which of the assigned network resources are currently in use.

18. The apparatus of claim 17, wherein the control logic configured to allocate is further configured to select network resources from the first portion of the shared L1-VPN network resources that have been assigned to the L1-VPN and which are not currently in use to fulfill the request, and select public network resources to augment the assigned resources to fulfill the request if necessary.

19. The apparatus of claim 18, wherein the first L1-VPN and second L1-VPN are a first group of L1-VPNs, and wherein the control logic configured to allocate is further configured to prioritize between L1-VPNs to enable the first L1-VPN to obtain L1-VPN resources associated with the first portion of the shared L1-VPN network resources that are currently assigned to a third L1-VPN that is not part of the first group of L1-VPNs.

20. The apparatus of claim 19, wherein prioritizing results in a transfer of the network resource from the third L1-VPN to the first L1-VPN.

* * * * *